Figure 1:
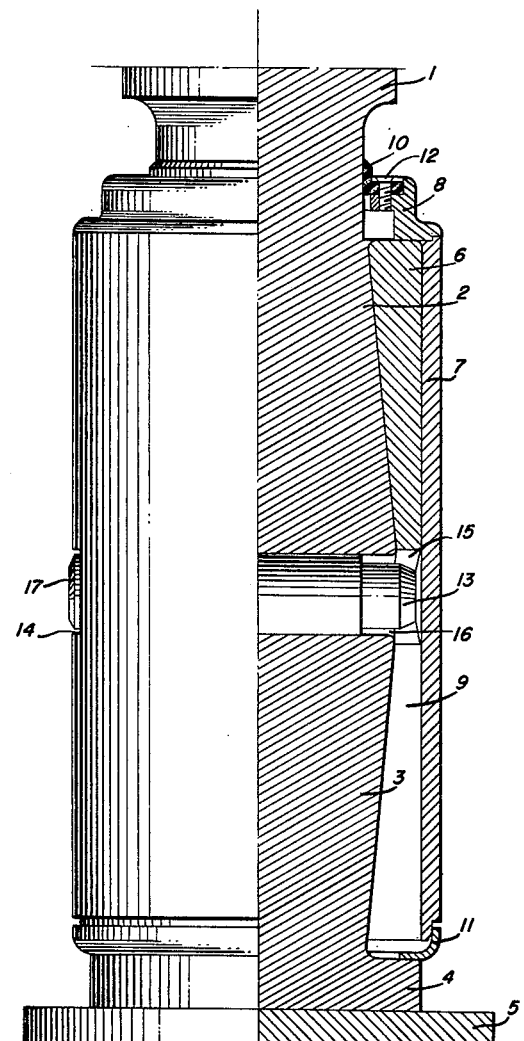

April 6, 1965 H. ENGELHARDT ETAL 3,177,394
SECURING DEVICE FOR FURNACE ELECTRODES
Filed July 14, 1960 2 Sheets-Sheet 1

INVENTORS
HORST ENGELHARDT
GERHARD KARL AUGUST HESTERMANN
HELMUT SCHEIDIG
ANTON WAMSER

BY Klein and Padlon

ATTORNEYS

United States Patent Office 3,177,394
Patented Apr. 6, 1965

3,177,394
SECURING DEVICE FOR FURNACE ELECTRODES
Horst Engelhardt, Gerhard Karl August Hestermann, Helmut Scheidig, and Anton Wamser, all of Hanau am Main, Germany, assignors to W. C. Heraeus G.m.b.H., Hanau am Main, Germany, a firm of Germany
Filed July 14, 1960, Ser. No. 42,788
Claims priority, application Germany, July 18, 1959, H 36,965
11 Claims. (Cl. 314—130)

The present invention relates to a securing device for furnace electrodes, and more particularly to a securing device for consumable electrodes for electric arc furnaces.

In the operation of electric arc furnaces it has been a difficult problem for a long time to provide suitable means for properly securing the consumable electrode to its supporting rod and for also insuring a proper transmission of the current from the supporting rod to the electrode.

In the known types of such securing devices a stump which was welded to the consumable electrode was secured to the electrode supporting rod by a clamping device which engaged into annular grooves both in the electrode supporting rod and in the stump and was tightened on the supporting rod as well as on the stump by a plurality of bolts. This kind of a device had the same disadavntage as many other clamping, tightening, and pressure-applying means known in the art of electrode securing devices that, due to the passage of the high currents of several thousand amperes, which for large electrodes may amount even to 10,000 to 30,000 amperes, the securing device was heated considerably. This heating, in turn, resulted in an expansion and thus in a loosening of the bolt connections. Consequently, the electrode no longer remained securely connected to its supporting rod. This then resulted in a so-called cascade effect which means that through the loosening of the securing device the electric resistance was increased which, in turn, resulted in an increase in heat. This further increase in heat again resulted in a further loosening of the securing device which, in turn, increased the electric resistance, and so forth. In order to overcome this disadvantage it has therefore already been proposed to cool the securing device by a circulation of water. Any such built-in water circulation, however, always involves the great danger that, due to occasional deviations of the electric arc, the water-cooling conduits on the securing device or even their outer connections might become damaged.

It is the principal object of the present invention to provide a new kind of electrode securing device which will overcome all of the above-mentioned disadvantages. This may be attained according to the invention by making the securing device of two or more shell sections which enclose the adjacent end portions which are to be secured to each other, that is, either those of the electrode supporting rod and the electrode or of the supporting rod and the stump which is welded to the electrode and in which these two end portions are of a frusto-conical shape with the two frustums being inverted relative to each other so that the larger bases thereof face toward each other.

This type of connection has the advantage that any expansion of the securing means, that is, of the shell sections enclosing the adjacent end portions of the supporting rod and the electrode or the stump which is welded to the electrode will not affect their tight connection with these end portions since such expansion will be automatically compensated by the weight of the electrode. This type of connection has the further advantage that no screw connections are required which have the tendency to be loosened when heated. Another important feature of the new securing device is its extremely simple and inexpensive construction and the fact that it is easy to manipulate, and further that it is fully capable of withstanding both the mechanical and electrical stresses to which it will be subjected.

Figure 2:
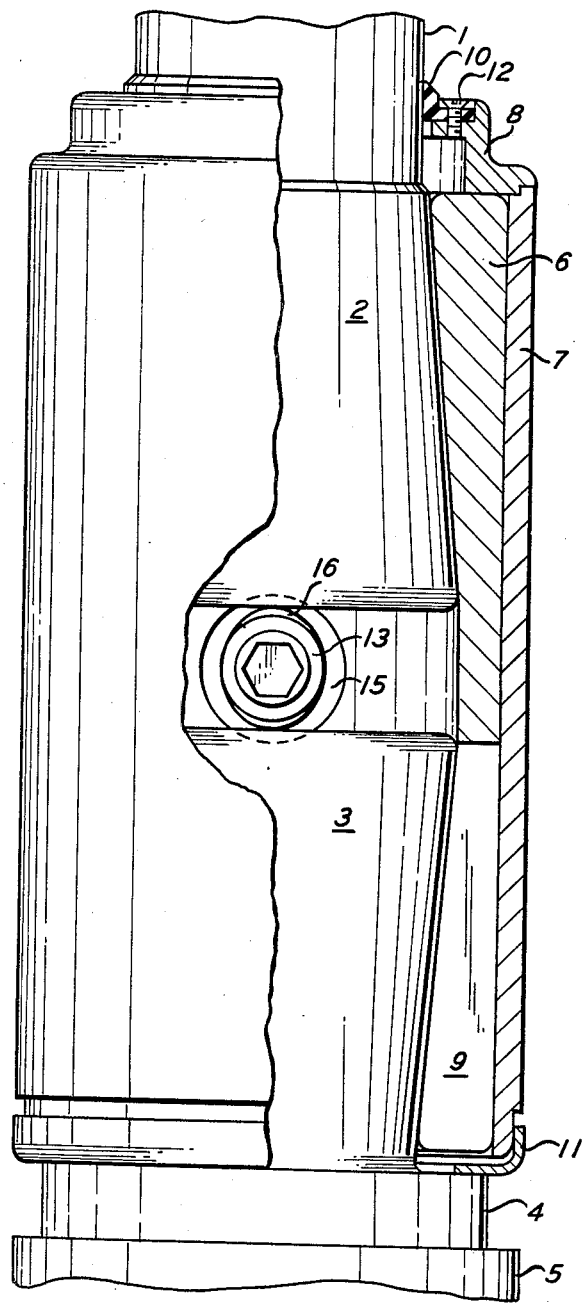

The above-mentioned as well as additional objects, features, and advantages of the present invention will become further apparent from the following detailed description thereof, particularly when read with reference to the accompanying drawing wherein FIGURE 1 shows one preferred embodiment of the securing device according to the invention, partly in a side view and partly in cross section, and FIGURE 2 shows the securing device, partly in cross-section, and along a longitudinal transverse line.

In this drawing, the electrode supporting rod 1 has a lower end portion 2 which is made of a frusto-conical shape, the larger base of which faces toward the base of a similar frusto-conical upper end portion 3 of a stump 4 which is welded at its lower end to a consumable electrode 5. The two conical end portions 2 and 3 are enclosed by a pair of half-shells 6 which, in turn, are enclosed by a cylindrical steel jacket 7 which is adapted to take up the wedging forces which are exerted thereon by the conical walls of the end portions 2 and 3 under the weight of the electrode 5. The upper end of jacket 7 is provided with a collar 8 which is welded thereto and serves as a stop for the two half-shells 6 when the jacket is fitted from above over the half-shells. The lower parts of the two half-shells 6 which surround the frusto-conical end portion 3 of stump 4 are provided with a plurality of slots 9 which extend radially through these parts and are adapted to compensate for the heat expansion of the end portion 3 of stump 4 and of the half-shells 6. For transmitting the current from the supporting rod 1 through stump 4 to the electrode 5, the half-shells 3 are preferably made of copper, whereas the supporting rod 1 itself preferably consists of a harder metal so that the conical end portion 2 thereof will be protected from excessive wear. It may even be advisable to provide this end portion 2 with a hard chromium plating, in which event there will be practically no wear on the surfaces of the supporting rod.

In order to prevent any dirt or splashed parts of metal from entering between the adjacent conical surfaces, both the upper and lower ends of steel jacket 7 may be provided with removable steel rings 10 and 11. The upper ring 10 is preferably secured by bolts 12 to collar 8 on jacket 7, while the lower ring 11 is only loosely fitted over the lower end of jacket 7 and into a gap between the lower end of the half-shells 6 and the projecting edge of stump 4.

When the two conical parts 2 and 3 are connected to each other by the two half-shells 6 which, in turn, are enclosed by the steel jacket 7, the opposite bases of parts 2 and 3 are spaced from each other at a certain distance to form a gap into which a wedging member 13 is then inserted through an aperture 14 in jacket 7 and an aperture 15 in each half-shell 6. This wedging member 13 has a pair of diametrically opposite cam projections 16 along the greatest part of its length and suitable means at one end, for example, a hexagon head, to permit the two conical parts 2 and 3 to be wedged apart, for example, by means of a socket wrench so as to prevent them from being loosened from the half-shells 6 in the event that the electrode 5 is set upon the bottom of the crucible. After the wedging member 13 is inserted and tightened, the opening 14 in jacket 7 is closed tightly by a cap 17.

The securing device according to the invention insures a mechanical and electrical connection between the consumable electrode 5 and its supporting rod 1 which automatically remains secure due to the weight of the electrode and does not require any additional clamping means, such as bolts. It is also evident from the drawing that it is of a very simple and inexpensive structure and may also be easily applied and manipulated. Furthermore, it has the advantage that due to the double-conical shape of the inner walls of the connecting means, i.e. the two half-shells 6, and the corresponding frusto-conical shape of the end portions 2 and 3 of the supporting rod 1 and the electrode 5 or its connecting stump 4, the electrode will be automatically centered relative to the supporting rod and thus also relative to the crucible, so that in most cases the usual centering means may be omitted. The entire securing device may also be easily removed from the electrode supporting rod 1 and the electrode 5 or its connecting stump 4 since this only requires the wedging member 13 to be loosened or removed and the remaining end of the consumed electrode then to be set upon a solid surface so that the conical surfaces of the end portions 2 and 3 will loosen from the corresponding conical surfaces of the two half-shells 6 which, in turn, will loosen from the steel jacket 7 so that the latter can then be withdrawn in the upward direction from shells 6, whereupon the latter can be removed from the conical ends 2 and 3. A new consumable electrode may then be inserted. If necessary, the half-shells 6 may then also be replaced by a new pair. Since the half-shells 6 consist of a softer material than the electrode supporting rod 1, the latter will also be protected from any wear.

Although this invention has been illustrated and described with reference to the preferred embodiment thereof, it is to be understood that it is in no way limited to the details of such embodiment but that it is capable of numerous modifications within the scope of the appended claims. Thus, for example, instead of providing two doubly conical half-shells 6 for connecting the two end portions 2 and 3 of the supporting rod 1 and the electrode 5 or its connecting stump 4 to each other, a larger number of shell sections may be used. Also, as already indicated, the consumable electrode itself may be provided with an upper end portion of an inverted frusto-conical shape so that the connecting stump 3, 4 may be omitted.

Having thus fully disclosed our invention, what we claim is:

1. A device for securing a vertical electrode and especially a consumable electrode of an electric arc furnace to a vertical electrode supporting rod disposed above and substantially coaxially with said electrode, comprising an end portion of a frusto-conical shape on said electrode and a similar end portion on said supporting rod, the larger bases of the two frustums facing toward each other, a shell substantially enclosing both of said end portions and being divided longitudinally into at least two shell sections having inner walls of a doubly conical shape complementary to the frusto-conical shape of said two end portions, and means for securing said shell sections to each other to prevent them from expanding under the wedging action of the outer conical surfaces of said end portions against the inner conical surfaces of said shell sections under the weight of the electrode, and operative wedging member intermediate the larger bases to keep said bases in fixed relation with respect to the shell.

2. An electrode securing device as defined in claim 1, in which said securing means comprise a tubular steel jacket enclosing said shell sections.

3. An electrode securing device as defined in claim 1, in which said shell sections consist of an electrically conductive material for also transmitting high electric currents from said electrode supporting rod to said electrode.

4. An electrode securing device as defined in claim 1, in which said electrode comprises a secured consumable electrode and a connecting stump welded to the upper end of said consumable electrode, the free end of said stump forming said frusto-conical end portion of said electrode.

5. An electrode securing device as defined in claim 1, in which the lower parts of said shell sections adapted to enclose the frusto-conical end portion of said electrode are slotted to compensate for the heat expansion of said end portion and of said shell sections.

6. An electrode securing device as defined in claim 1, in which, when said two end portions are connected to each other by said shell sections, said larger bases of said end portions are spaced from each other to form a gap, and said wedging member being inserted into said gap and adapted to exert a wedging action upon both of said bases in opposite axial directions of said supporting rod and said electrode.

7. An electrode securing device as defined in claim 6, in which said securing means comprise a tubular steel jacket enclosing said shell, said jacket having at least one aperture in its wall and said shell having a pair of apertures diametrically opposite to each other and in line with said aperture in said jacket to permit said wedging member to be inserted into said gap and to be tightened against said bases from the outside of said jacket.

8. An electrode securing device as defined in claim 7, in which said wedging member has a pair of longitudinal diametrically opposite cam surfaces, and at least one end portion on said member and normally disposed within said jacket for connecting a tool for turning said member about its axis, and a removable cap for tightly closing said aperture in said jacket.

9. An electrode securing device as defined in claim 2, further comprising a collar integrally secured to the upper end of said jacket and having a smaller inner diameter than said jacket to serve as a stop for the upper end of said shell sections.

10. An electrode securing device as defined in claim 2, further comprising removable sealing means connecting the upper and lower ends of said jacket to said supporting rod and said electrode, respectively, for preventing the entry of foreign matter into said device.

11. An electrode securing device as defined in claim 1, in which said end portion of said supporting rod consists of a harder metal than said shell sections.

References Cited by the Examiner
UNITED STATES PATENTS

| | | | |
|---|---|---|---|
| 768,694 | 8/04 | Rich | 287—114 |
| 1,281,284 | 10/18 | Brunson | 287—114 X |
| 1,702,359 | 2/29 | Molmark | 13—16 X |
| 2,052,394 | 8/36 | Fullman | 285—309 X |
| 2,592,517 | 4/52 | Ingelsrud | 13—14 X |
| 2,771,498 | 11/56 | Bredtschneider et al. | 13—14 |

RICHARD M. WOOD, *Primary Examiner.*

ORIS L. RADER, JOSEPH V. TRUHE, *Examiners.*